US011814692B2

(12) United States Patent
Kleier et al.

(10) Patent No.: US 11,814,692 B2
(45) Date of Patent: Nov. 14, 2023

(54) CONVERTER TORQUE SUPPORT (71) Applicant: SMS GROUP GMBH, Düsseldorf (DE)

(72) Inventors: Tim Kleier, Haan (DE); Christian Osterloh, Ascheberg (DE); Stephan Schulze, Meerbusch (DE); Jörg Hertel, Hilchenbach (DE); Benjamin Wallmeroth, Neunkirchen (DE); Reiner Stammberger, Kreuztal (DE); Andreas Runge, Remscheid (DE); Daniel Beckers, Dorsten (DE); Jürgen Unterloh, Hünxe (DE); Malte Braam, Krefeld (DE)

(73) Assignee: SMS GROUP GMBH, Düsseldorf (DE)

( * ) Notice: Subject to any disclaimer, the term of this patent is extended or adjusted under 35 U.S.C. 154(b) by 257 days.

(21) Appl. No.: 17/265,984

(22) PCT Filed: Aug. 1, 2019

(86) PCT No.: PCT/EP2019/070832
§ 371 (c)(1),
(2) Date: Feb. 4, 2021

(87) PCT Pub. No.: WO2020/030530
PCT Pub. Date: Feb. 13, 2020

(65) Prior Publication Data
US 2021/0381070 A1    Dec. 9, 2021

(30) Foreign Application Priority Data

Aug. 8, 2018  (DE) ................... 10 2018 213 291.7

(51) Int. Cl.
C21C 5/46      (2006.01)
F27B 3/12      (2006.01)

(52) U.S. Cl.
CPC ............ *C21C 5/464* (2013.01); *C21C 5/4673* (2013.01); *F27B 3/12* (2013.01)

(58) Field of Classification Search
CPC .......... C21C 5/464; C21C 5/4673; F27B 3/12
See application file for complete search history.

(56) References Cited

U.S. PATENT DOCUMENTS 4,093,192 A * 6/1978 Riegler ..................... C21C 5/50
                                                            73/862.541
4,121,481 A   10/1978 Riegler
(Continued)

FOREIGN PATENT DOCUMENTS

AT       354490 B      1/1980
DE      2654907 A      6/1977
(Continued)

*Primary Examiner* — Scott R Kastler
(74) *Attorney, Agent, or Firm* — LUCAS & MERCANTI, LLP; Klaus P. Stoffel (57) ABSTRACT A method for operating a converter and a support device for the converter. The converter is rotatably or tiltably mounted and rotatably coupled in a transmission via support pins in the support device. The transmission is supported permanently on a base via a torque support. In order to reduce costs for a corresponding support device and, simultaneously, so as to be able to better control the torque exerted by the converter on the transmission, the time-variable actual torque $M_{Ist}$ exerted by the converter on the transmission is controlled to a predefined target torque $M_{soll}$.

16 Claims, 4 Drawing Sheets

(56) References Cited

U.S. PATENT DOCUMENTS

| | | | |
|---|---|---|---|
| 4,215,852 A | 8/1980 | Ackermann | |
| 4,265,136 A | 5/1981 | Riegler | |
| 4,298,378 A | 11/1981 | Murakami | |
| 4,467,666 A | 8/1984 | Ackermann | |
| 6,299,829 B1 | 10/2001 | Chichery | |
| 8,007,711 B2 | 8/2011 | Imiela | |
| 8,109,168 B2 | 2/2012 | Wurm | |
| 8,820,699 B2 | 9/2014 | Hertel | |
| 9,840,746 B2 | 12/2017 | Lundstrom | |
| 2010/0084795 A1* | 4/2010 | Imiela | C21C 5/50 266/44 |
| 2011/0204204 A1* | 8/2011 | Hertel | F16H 57/025 248/562 |
| 2012/0000315 A1* | 1/2012 | Fleischanderl | C21C 5/34 75/375 |
| 2021/0381070 A1* | 12/2021 | Kleier | C21C 5/464 |

FOREIGN PATENT DOCUMENTS

| | | | |
|---|---|---|---|
| DE | 2655344 A1 | 6/1977 | |
| DE | 3007916 C2 | 11/1982 | |
| DE | 2658885 C2 | 6/1985 | |
| DE | 3827329 A1 | 2/1990 | |
| DE | 60004714 T2 | 7/2004 | |
| EP | 0003108 A1 | 7/1979 | |
| EP | 2082068 B1 | 12/2010 | |
| JP | 2012025980 A | 2/2012 | |
| WO | 03023072 A1 | 3/2003 | |
| WO | 2009155892 A2 | 12/2009 | |

* cited by examiner

CONVERTER TORQUE SUPPORT

CROSS-REFERENCE TO RELATED APPLICATIONS

The present application is a 371 of International application PCT/EP2019/070832, filed Aug. 1, 2019, which claims priority of DE 10 2018 213 291.7, filed Aug. 8, 2018, the priority of these applications is hereby claimed and these applications are incorporated herein by reference.

BACKGROUND OF THE INVENTION

The invention relates to a method for operating a converter, in particular an argon oxygen decarburization AOD converter, and to a supporting device for such a converter.

In a converter, excess carbon is oxidized out by feeding oxygen into the liquefied pig iron. This turns the pig iron into steel.

Such processes are known in principle in the prior art.

Figure 4:
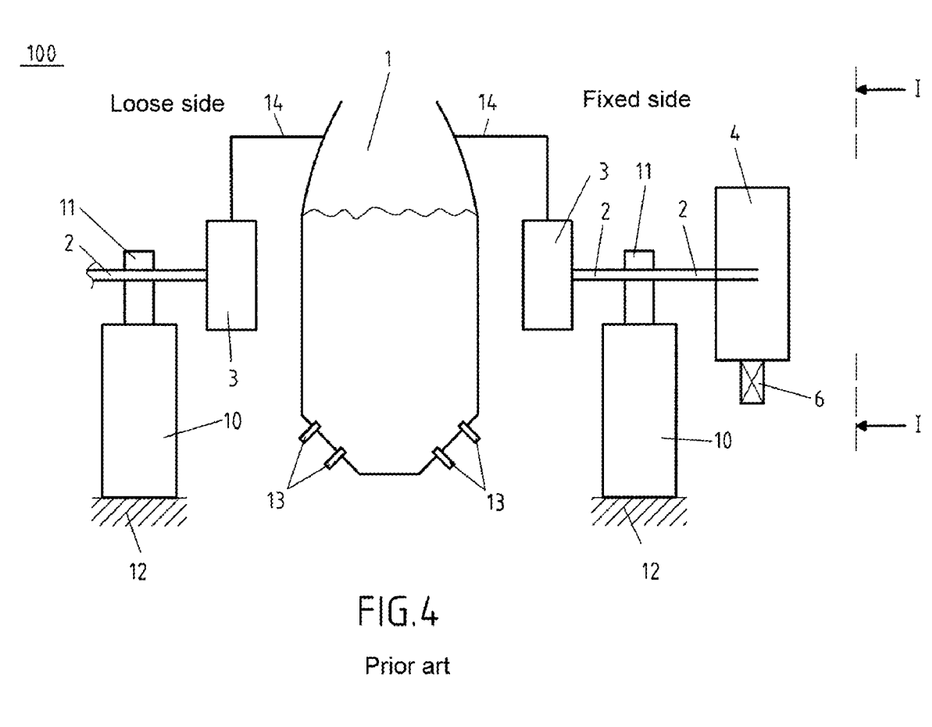
FIG. 4 shows the supporting device for the converter in a front view according to the prior art.

For better understanding of the following invention, first the basic mounting and suspension of such an AOD converter, as it is known in principle from the prior art, is described on the basis of FIG. 4:

FIG. 4 shows the converter 1 with under-bath-level gas nozzles 13, arranged in its bottom, for feeding oxygen or other gases into the interior of the converter during its operation. This converter 1 is suspended in a baling ring 3 by means of supporting elements 14. Respectively attached on opposite sides of the baling ring 3 are supporting journals 2, which are in line with one another in their longitudinal axes and which define the tilting axis of the converter. The supporting journals 2 are rotatably mounted in bearings 11. The bearings 11 are for their part respectively supported on the foundation 12 by means of bearing blocks 10. On the fixed side of this arrangement, the supporting journal 2 is extended in its axial direction beyond the bearing 11 and is rotatably coupled with a gear mechanism 4. By means of the gear mechanism 4 and the supporting journals 2, the converter 1 is connected to a rotary drive, which is preferably integrated in the gear mechanism. The gear mechanism 4 is likewise supported on the foundation 12 by means of a torque support 6, which in the view according to FIG. 4 extends perpendicularly to the plane of the drawing.

The known supporting device 100 described thus far also applies to the present invention. Said torque support is often designed in the prior art as passive, for example in the form of a torsion shaft or in the form of preloaded spring assemblies; see in this respect DE 38 27 329 A1, WO 03/023 072 A1, DE 26 54 907 A1, EP 003 108 A1, DE 30 07 916 C2, DE 600 04 714 T2, JP 2012-25980 A and U.S. Pat. No. 4,298,378.

U.S. Pat. No. 4,093,192 discloses that the tilting moment of the converter is measured and is compared with a predetermined tilting moment. If it is found that the measured actual tilting moment exceeds the predetermined setpoint tilting moment, it is provided that the tilting drive for the converter is switched off.

U.S. Pat. No. 9,840,746 B2 describes a tilting drive for a converter, the tilting drive consisting substantially of a hydraulic motor for tilting the converter about the horizontal axis. The torque of the motor is measured in dependence on the maximum tilting moment of the converter. It is explained that the converter is always striving to assume a neutral position, in which it is typically during a blowing mode.

During its operation, the converter undergoes vigorous vibrations, in particular because of the blowing in of oxygen through said under-bath-level nozzles 13 into the steel bath located inside it described at the beginning. This excitation takes place over a wide range in all directions, that is to say also in the tilting direction of the converter. Other causes of uncontrolled vibration of the converter, though only minor, may be burning away of its refractory lining and/or skull formation. Great forces then act on the foundation of the casting platform and on the torque support; these vibrations often also cause damage to the torque support and the casting platform and also to further parts of the installation.

The technical teachings as described in the cited prior art documents are not suitable for solving the described problem of vibrations; in the case of these solutions, the forces and vibrations occurring are at most damped; but the torque supports must themselves absorb to some extent the great forces mentioned, as a result of which they often become damaged themselves.

Another concept for solving this problem is described in the European patent EP 2 082 068 B1. In the case of the method described there, it is provided that the torque support only rigidly connects the gear mechanism to the foundation during the operation of tilting the converter, and that during the blowing mode of the converter the torque support is instead released from the foundation or from the gear mechanism, or from both, so that the converter can then oscillate freely during the blowing mode. As an alternative to the torque support, a shock absorber may be used during the blowing mode.

However, this proposed solution has the disadvantage that quite a lot of equipment and—in the case of retrofitting—extensive conversion work are required for the implementation of a corresponding switchable torque support.

SUMMARY OF THE INVENTION

The invention is based on the object of providing an alternative method for operating a converter, in which the costs for a supporting device for the converter are reduced and at the same time the torque exerted on the gear mechanism by the converter can be controlled better.

The term "blowing mode" means generally the feeding of oxygen and usually other process gases into a melt, for example a steel melt or a liquid pig iron, in a converter. The method according to the invention and the claimed supporting device concern converter operation in general; they are not restricted to the production of high-grade steel.

The claimed control of the torque exerted on the gear mechanism by the converter advantageously makes it possible that the converter can in principle move freely during a blowing mode, in particular that the converter can then oscillate freely, i.e. without any positional limitation. This is true because the claimed torque control—as a difference from positional control—does not limit the converter to certain angular positions in its vibrational amplitudes. The claimed control method advantageously helps to prevent the converter from vibrating to a resonant frequency any more—as sometimes occurred in the past in the prior art—and thereby being able to inflict great damage on parts of the supporting device, in particular on the gear mechanism and the torque support.

In principle, the claimed torque control allows any vibrational amplitudes of the converter, while at the same time however it limits the torque exerted on the gear mechanism by the converter, specifically controls it to a specified setpoint torque. This setpoint torque is specified such that it lies in the permissible operating range of the gear mechanism, the drive and the torque support, that is to say in particular does not damage these components.

Providing the claimed control obviates the need for expensively equipping the supporting device in the way known from the prior art in the area around the torque support in order to stabilize the converter.

According to an exemplary embodiment, the invention provides that the setpoint torque is specified as an average, preferably a moving average, of a plurality of sampled values of the determined time-variable actual torque of the converter on the gear mechanism. For this purpose, at the beginning of the blowing operation, an initial average value is determined for a certain time and is subsequently renewed on a moving basis in each measuring cycle.

According to a further exemplary embodiment of the invention, it is advantageous if the claimed superordinate torque control is supported or supplemented by a subordinate positional control for the gear mechanism. This positional control has the task of keeping the gear mechanism in a specified setpoint angular position, preferably in a horizontal position of the gear mechanism, specifically independently of the tilting position of the converter.

The terms "positional control" and "angular positional control" are used synonymously. The terms "angular orientation" and "angular position" are also used synonymously.

Both claimed control systems, i.e. both the torque control and the angular positional control, act during the blowing mode of the converter on the same adjusting element, to be specific a so-called torque support. This is for example a hydraulic cylinder with a connected servo valve or an electromechanical drive.

When the subordinate positional control for the gear mechanism is in operation in addition to the superordinate torque control, both control systems each provide a certain component of an adjusting signal for the adjusting element in the form of the torque support. According to the invention, in this case the component of the adjusting signal provided by the positional control is much smaller than the component provided by the torque control; for example, there is a factor of 10 to a 100 between these two components. This difference in the order of magnitude of the components is reflected in the terminology of "superordinate control" and "subordinate control".

All of the statements made so far concerned the converter in said blowing mode. The method according to the invention may additionally provide that, when it is not in the blowing mode, it may just undergo angular positional control for the gear mechanism; during this time, the claimed torque control is switched off. For this angular positional control when not in the blowing mode, the same control circuit with the same controller and the same adjusting element in the form of the torque support as for the subordinate angular positional control during the blowing mode can be used. Specifically, the actual angular position of the gear mechanism is then controlled to a specified setpoint angular position, this setpoint angular position being for example 0°, i.e. the gear mechanism is then aligned horizontally. When not in the blowing mode, the component of the adjusting signal for the torque support provided by the torque control circuit is zero, while the component of the adjusting signal provided by the angular positional control circuit is 100%.

This positional control for the gear mechanism when the converter is not in the blowing mode is appropriate to the extent that, during this time, the converter is tilted about the supporting journals by means of the gear mechanism and a driver assigned to the gear mechanism, and to this extent the converter then does not itself have a fixed angular position or tilted position.

The aforementioned object of the invention is also achieved by a supporting device for the converter. The advantages of this solution correspond to the advantages mentioned above with respect to the claimed method.

BRIEF DESCRIPTION OF THE DRAWING

Four figures are appended to the description, where.

DETAILED DESCRIPTION OF THE INVENTION

The invention is described in detail below in the form of exemplary embodiments with reference to the FIGURES mentioned. In all of the figures, identical technical elements are denoted by the same reference signs.

Figure 1:
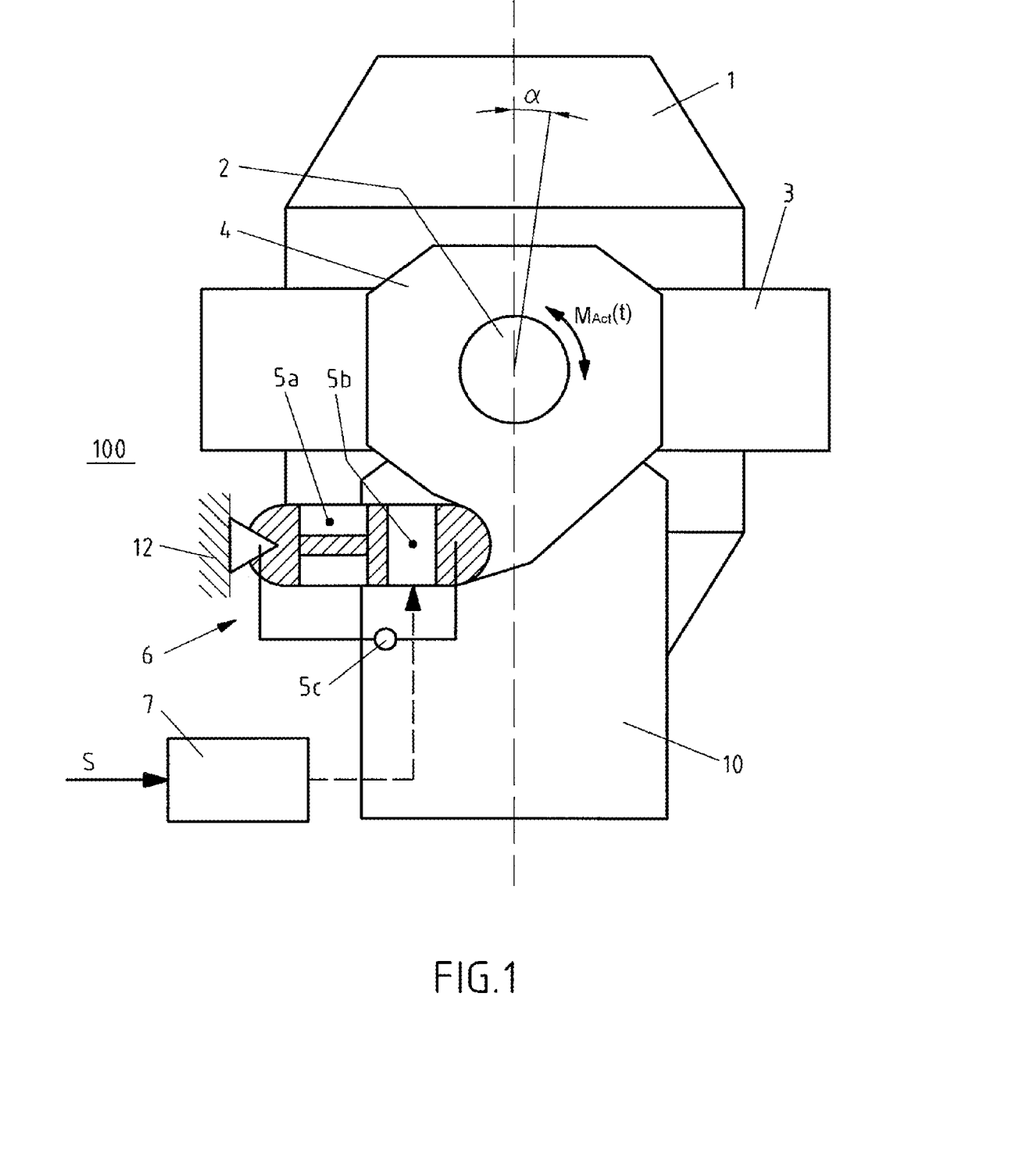
FIG. 1 shows the supporting device according to the invention with the suspended converter in a side view.

FIG. 1 illustrates the supporting device 100 already known from FIG. 4 for the converter 1 once again in a side view. In this side view, it can be seen in particular that the torque support 6, which by way of example is designed here as a hydraulic cylinder with an assigned servo valve 7. The torque support 6 forms together with the servo valve 7 an adjusting element as part of the control systems according to the invention. In accordance with an adjusting signal S, the servo valve 7 controls the pressure within a piston region of the hydraulic cylinder. The pressure in an annular region of the hydraulic cylinder is continuously sensed by a first pressure sensor 5a and the pressure in the piston region of the hydraulic cylinder is continuously sensed by a second pressure sensor 5b for the control according to the invention.

Otherwise, the supporting device 100, on which the present invention is based, corresponds to the supporting device described in FIG. 4 and known from the prior art.

Figure 2:
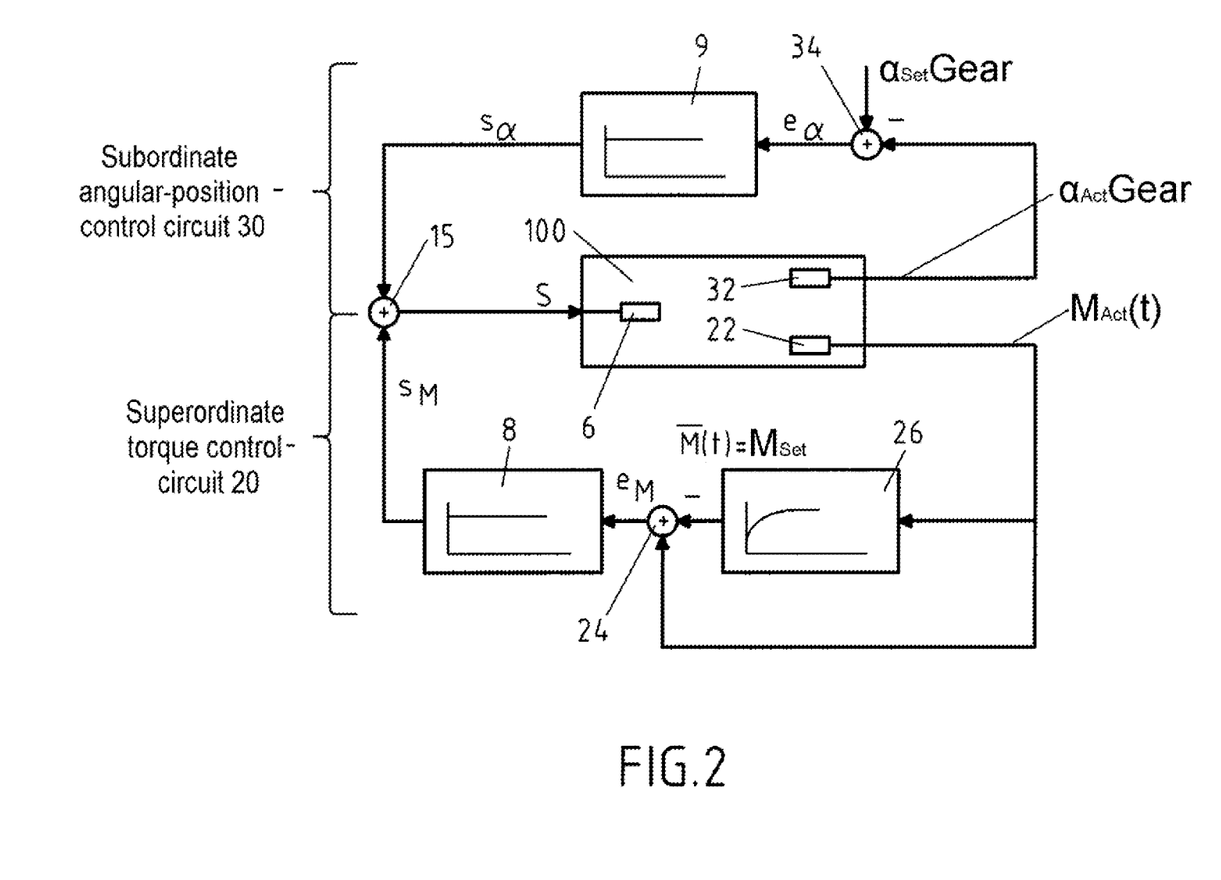
FIG. 2 shows the control of the torque on the gear mechanism and the angular position of the gear mechanism during a blowing mode of the converter.

FIG. 2 describes the method according to the invention for operating the converter 1. The key concept of the present invention provides that the time-variable actual torque $M_{Act}$ (t) exerted on the gear mechanism 4 by the converter 1 is controlled to a specified setpoint torque by means of a torque control circuit 20. The control circuit 20 comprises firstly a torque determining device 22 for determining the time-variable actual torque $M_{Act}$ (t) exerted on the gear mechanism 4 by the converter 1. With the torque support 6 designed as mentioned as a hydraulic cylinder, the actual torque can be determined the time-dependent force on the piston of the hydraulic cylinder multiplied by the corresponding lever arm between the tilting axis of the converter (corresponding to the longitudinal axis of the supporting journals 20) and the longitudinal axis of the hydraulic cylinder 6. The force on the piston can be calculated by sensing the pressures in the annular region and in the piston region of the hydraulic cylinder by means of the first and second pressure sensors 5a, 5b while taking into account the respectively effective pressure areas of the piston. The torque control circuit 20 also comprises a first comparator device 24 for determining a torque system deviation $e_M$ as the difference between the specified setpoint torque $M_{Set}$ and the actual torque $M_{Act}$. Furthermore, the control circuit comprises a first control device 8, for example in the form of a proportional-integral-differential PID controller, for generating a first component $s_M$ of an adjusting signal S for the torque support or the servo valve 7 as an adjusting element in accordance with the torque system deviation $e_M$ such that the torque system deviation becomes zero. The setpoint torque $M_{Set}$ can then be specified in principle to whatever torque is desired. It is however preferably generated by a setpoint-torque generating device 26, by forming an average, preferably a moving average, over time of a multiplicity of measured actual torques $M_{Act}$ (t).

As stated, the torque control circuit 20 serves the purpose of controlling the actual torque 1 $M_{Act}$ (t) exerted on the gear mechanism by the converter 1 or correspondingly keeping it constant at the level of the setpoint torque. The converter 1 is in this case advantageously not fixed in any way in its angular position with respect to the gear mechanism; rather, it can freely position itself in its angular orientation, or it can oscillate freely. Only the torque exerted on the gear mechanism is controlled and limited by the torque control.

In order however also have an influence on the angular orientation α of the gear mechanism 4, the present invention advantageously provides according to an exemplary embodiment that, during a blowing mode of the converter, in addition to said control of the torque, the angular position α of the gear mechanism 4 is also controlled by means of an angular-orientation positional control circuit 30. This angular-position control circuit 30 comprises an angular-orientation determining device 32 for measuring the actual angular orientation $\alpha_{Act}$ of the gear mechanism 4 on a time-dependent basis. This angular-orientation determining device 32 may for example be designed in the form of a displacement pickup 5c, which uses measuring technology to sense the deflection of the torque support 6 in the form of the hydraulic cylinder. The deflection of the torque support 6 measured in this way makes it possible to calculate the actual angular position α of the gear mechanism with respect to the horizontal while taking into account the distance of the hydraulic cylinder from the tilting axis of the converter in the form of the longitudinal axis of the supporting journals 2. In addition, the angular-position control circuit 30 has a second comparator device 34 for determining an angular-orientation system deviation $e_\alpha$ as the difference between a setpoint angular orientation, preferably, α=0°, and the measured actual angular orientation $\alpha_{Act}$ (t). Furthermore, the control circuit 30 has a second control device 9, for example likewise in the form of a PID controller, for generating a second component $s_\alpha$ of the adjusting signal S for the torque support 6 as an adjusting element in accordance with the previously determined angular-orientation system deviation ea. Finally, an adding device 15 is provided for adding the first and second components $s_M$ and $s_\alpha$ to form the adjusting signal S. In this case, the adjusting signal S is designed such that, as far as possible, the torque system deviation and the angular-orientation system deviation each become zero during the blowing mode of the converter.

The size of the first component $s_M$, which represents the component of the adjusting signal S provided by the torque control, and the size of the second component sa, which represents the component of the adjusting signal S provided by the angular position control, can each be variably set by means of a component adjusting device. According to the invention, during the blowing mode of the converter, the first component $s_M$ is much greater than the second component sa. To this extent, the torque control is superordinate to the angular-position control for the gear mechanism.

Figure 3:
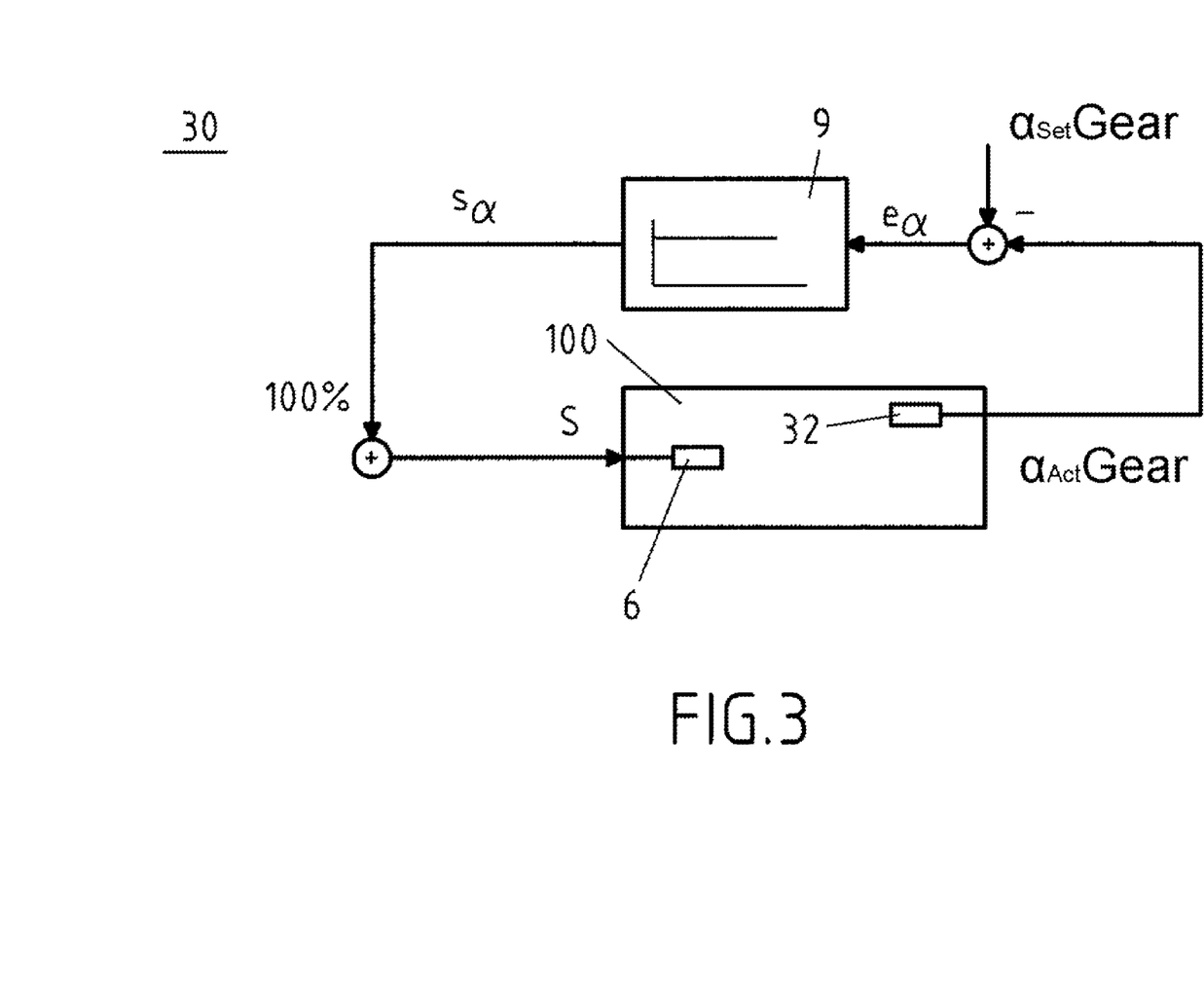
FIG. 3 shows the control of the angular position of the gear mechanism when not in the blowing mode.

FIG. 3 illustrates the method for operating the converter 1 when it is not in the casting-blowing mode. Typically, a tilting of the converter then takes place by means of the rotary drive about the longitudinal axes of the supporting journals 2, in order to at least partially empty the converter. During this operating phase, the invention provides that only the actual angular orientation $\alpha_{Act}$ of the gear mechanism 4 is then controlled or set to a specified setpoint angular orientation of the gear mechanism $\alpha_{Set}$. This takes place with the angular-position control circuit 30 already described with reference to FIG. 2. This control circuit 30 remains unchanged from the blowing mode also for the operating phase when not in the blowing mode. The only difference is that, when not in the blowing mode, the adjusting signal S corresponds 100% to the controller output signal $s_\alpha$ generated by the second control device 9. The component $s_M$ of the torque control circuit 20 is set to 0 or switched off during this operating phase. Typically, when not in the blowing mode, the gear mechanism is controlled to an angular orientation position of $\alpha_{Set}$=0° (=horizontal position of the gear mechanism).

The second control device 9 is preferably also designed as a PID controller.

Both in the case of the first control device 8 and in the case of the second control device 9, the size of the components $s_M$, $s_\alpha$ of the adjusting signal S respectively provided by them is decisively determined by their respective proportional component P. Then, the setting of the P component corresponds to said component adjusting device.

LIST OF REFERENCE SIGNS

1 Converter
2 Supporting journal
3 Baling ring
4 Gear mechanism, preferably with integrated rotary drive
5a Pressure sensor
5b Pressure sensor
5c Displacement pickup
6 Torque support (adjusting element)
7 Servo valve
8 First control device
9 Second control device
10 Bearing block
11 Bearing
12 Foundation
13 Under-bath-level gas nozzles
14 Supporting elements
15 Adding device
20 Torque control circuit
22 Torque determining device
24 First comparator device
26 Setpoint-torque generating device
30 Angular-position control circuit
32 Angular-orientation determining device
34 Second comparator device
100 Supporting device
$e_\alpha$ Angular-orientation system deviation
$e_M$ Torque system deviation
$\alpha_{Set-Gear}$ Setpoint angular orientation for the gear mechanism
$\alpha_{Act-Gear}$ Actual angular orientation for the gear mechanism
$M_{Act}$(t) Actual torque of the converter
$M_{Set}$ Specified setpoint torque $s_M$ First component of an adjusting signal for the torque support $s_\alpha$ Second component of the adjusting signal for the torque support S Adjusting signal α Angular position of the gear mechanism

The invention claimed is:

1. A method for operating a converter that is mounted in a gear mechanism by supporting journals so that the converter is tiltable about longitudinal axes of the supporting journals and rotatably coupled with the gear mechanism, the converter and the gear mechanism being permanently supported on a foundation by a torque support, the torque support being a hydraulic cylinder with a connected servo valve or an electromechanical drive, the method, in a blowing mode of the converter, comprising:

controlling a time-variable actual torque $M_{Act}$ exerted on the gear mechanism by the converter to a specified setpoint torque $M_{Set}$, the step of controlling the torque comprising the following substeps:

measuring the time-variable actual torque $M_{Act}$ exerted on the gear mechanism by the converter;

specifying the setpoint torque $M_{Set}$;

determining a torque system deviation as a difference between the setpoint torque $M_{Set}$ and the actual torque $M_{Act}$;

generating, by a first control device, a first component of an adjusting signal for the torque support as an adjusting element in accordance with the torque system deviation; and activating the torque support with the adjusting signal so that the torque system deviation becomes zero.

2. The method according to claim 1, including specifying the setpoint torque as an average of a plurality of sampled values of the determined time-variable actual torque.

3. The method according to claim 1, further comprising controlling an actual angular position of the gear mechanism during the blowing mode of the converter to a specified setpoint angular position of 0°.

4. The method according to claim 3, wherein the step of controlling the angular position α comprises the following substeps:

measuring the actual angular orientation of the gear mechanism;

specifying the setpoint angular orientation of the gear mechanism;

determining an angular-orientation system deviation as a difference between the setpoint angular orientation and the actual angular orientation;

generating, by a second control device, a second component of the adjusting signal for the torque support as an adjusting element in accordance with the angular-orientation system deviation;

adding the first and second components to form the adjusting signal; and activating the torque support as an adjusting element with the adjusting signal so that, as far as possible, the torque system deviation and the angular-orientation system deviation each become zero.

5. The method according to claim 4, wherein the first component and the second component of the adjusting signal are each individually weighted, and wherein, during the blowing mode, the second component is smaller than the first component.

6. The method according to claim 5, wherein, the second component is smaller than the first component by a factor in a range of 100-10.

7. The method according to claim 1, wherein the torque support is a hydraulic cylinder with a connected servo valve.

8. The method according to claim 1, wherein, when the converter is not in a blowing mode, the method comprises the following step:

controlling the actual angular position of the gear mechanism to a specified setpoint angular position of 0°.

9. The method according to claim 8, wherein the step of controlling the angular position when not in the blowing mode comprises the following substeps:

measuring the actual angular orientation of the gear mechanism;

specifying the setpoint angular orientation of the gear mechanism;

determining the angular-orientation system deviation as a difference between the setpoint angular orientation and the actual angular orientation of the gear mechanism;

generating, by a second control device, the adjusting signal for the torque support as an adjusting element in accordance with the angular-orientation system deviation; and activating the torque support with the adjusting signal so that the angular-orientation system deviation becomes zero.

10. The method according to claim 1, further including tilting the converter when not in the blowing mode about the longitudinal axes of the supporting journals by a drive assigned to the gear mechanism.

11. A supporting device for a converter, comprising:

a baling ring with radially outwardly extending supporting journals for receiving the converter;

bearing blocks, supported on a foundation, with bearings arranged on the blocks and in which the supporting journals, and consequently the baling ring are rotatably mounted;

a drive with a gear mechanism, in which one of the supporting journals is mounted in a rotatably coupled manner for tilting the baling ring;

a torque support configured as a hydraulic cylinder with a connected servo valve or an electromechanical drive for supporting the gear mechanism with the drive with respect to the foundation; and a torque control circuit provided and configured to control a time-variable actual torque $M_{Act}$ exerted on the gear mechanism by the converter in a blowing mode to a specified setpoint torque $M_{Set}$, wherein the torque control circuit includes:

a torque determining device configured to determine the time-variable actual torque $M_{Act}$ exerted on the gear mechanism by the converter;

a first comparator device configured to determine a torque system deviation as a difference between the specified setpoint torque $M_{Set}$ and the actual torque $M_{Act}$; and a first control device configured to generate a first component of an adjusting signal for the torque support as an adjusting element in accordance with the torque system deviation so that the torque system deviation becomes zero.

12. The supporting device according to claim 11, further comprising a setpoint-torque generating device configured to calculate the setpoint torque by forming an average over time of a plurality of measured actual torques.

13. The supporting device according to claim 11, wherein the hydraulic cylinder has a first pressure sensor for sensing pressure in an annular region of the hydraulic cylinder, and has a second pressure sensor for sensing pressure in a piston region of the hydraulic cylinder, wherein the torque determining device is configured to determine an actual torque that the converter exerts on the gear mechanism by determining a force acting on a piston of the hydraulic cylinder from at least one of the sensed pressures and for calculating the actual torque by multiplication of the determined force by a lever arm between a longitudinal axis of the supporting journals and a longitudinal axis of the hydraulic cylinder.

14. The supporting device according to claim 11, further comprising an angular-position control circuit configured to control an actual angular position of the gear mechanism during the blowing mode of the converter to a specified setpoint angular position.

15. The supporting device according to claim 14, wherein the angular-position control circuit includes:
   an angular-orientation determining device configured to measure the actual angular orientation of the gear mechanism;
   a second comparator device configured to determine an angular-orientation system deviation as a difference between the setpoint angular orientation and the actual angular orientation;
   a second control device configured to generate a second component of the adjusting signal for the torque support as an actuating element in accordance with the angular-orientation system deviation; and
   an adding device configured to add the first and second components to form the adjusting signal; the adjusting signal being designed so that, as far as possible, the torque system deviation and the angular-orientation system deviation become zero.

16. The supporting device according to claim 15, further comprising at least one component adjusting device configured to set a size of the first and second components of the adjusting signal.

* * * * *